United States Patent Office
2,767,279
Patented Oct. 16, 1956

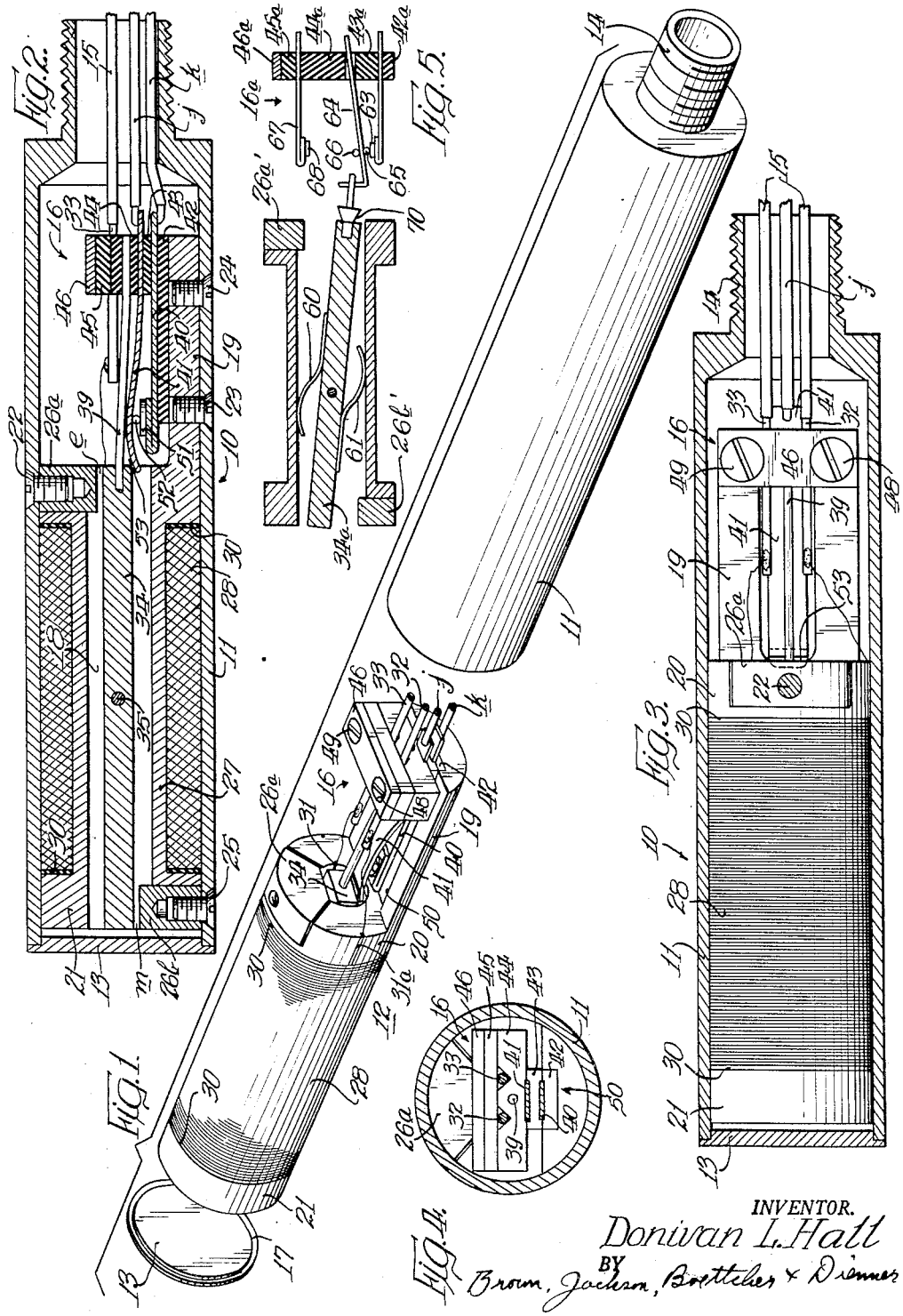

2,767,279
ELECTROMAGNETIC RELAY

Donivan L. Hall, Galion, Ohio, assignor to North Electric Company, a corporation of Ohio Application January 25, 1952, Serial No. 268,221

14 Claims. (Cl. 200—87)

This invention relates generally to a new and novel relay construction, and in particular to a relay structure which is especially adapted for use with equipment which in operation is subjected to severe acceleration forces along one or more of its coordinate axes.

In the provision of reliable and dependable automatic equipment of various types, the manufacturer is constantly faced with the problem of providing control systems which are minimally influenced by the acceleration and shock forces to which the equipment is subjected in use, this problem being especially serious in the case of aircraft, guided missiles and other types of free flight members. Basic to the solution of such problem is the provision of dependable relay units for accomplishing the circuit making and breaking functions in the control systems which will maintain their given assigned positions when subjected to these disturbing forces, and which will even further operate in the assigned manner under these adverse conditions.

This problem was one of the first encountered in the recent development of free flight equipment, and it soon became apparent that most known types of relay structures were not suitable for use in the free flight control systems. For example, it is not uncommon in the operation of such equipment to experience acceleration forces of 1,000 gravities in one direction while simultaneously experiencing forces of 100 gravities in one or both of the other two coordinate directions. Few of the contact members of known relay structures were capable of withstanding such forces and the movement of the contacts in response to these forces frequently resulted in improper system control and the consequent erratic performance of the equipment.

The need for a relay structure which was capable of effective, reliable and positive operation under adverse conditions such as these was quite evident. However, in addition to the problems resulting from the adverse force applications experienced by free flight equipment, economy of space and weight in this equipment are also primary considerations, and not infrequently the relays must necessarily operate responsive to the application of a minimum amount of energizing power. Accordingly, in addition to providing a relay which is comparatively insusceptible to applied acceleration forces of severe values, such relay also had to be of a limited size and operable in a positive manner responsive to the application of a minimum value of power.

In one type of known free flight missile, for example, a relay is required which will fit within the space normally occupied by a sub-miniature tube; that is a space approximately .4" in diameter and 1½" in length. Even further, the relay must be operable at its contacts to effect a switching operation in a maximum allowable time of 25 milliseconds with actual time being 5 milliseconds or less responsive to the application of as little as 250 milliwatts of power or less under no acceleration. Thus the problem of providing a relay structure which is operative under the adverse conditions set forth heretofore is further complicated by reason of the limited space and restricted power available to the members of the control systems for such equipment. Further confining specifications which are characteristic of this type equipment include the capability of functioning normally during and after being subjected to many hours of vibration, under conditions at least as requiring as .06" excursion and a frequency of vibration from 10 to 60 cycles per second.

It is apparent from the foregoing that there is a definite need in the field for a new and novel compact relay structure which is reliable in its operation when subjected to severe shock and acceleration forces and which will exhibit speed of action and excellent sensitivity in such operation. A specific object of the invention is to provide a relay of this construction which includes these features and advantages, and which is additionally comprised of a durable, sturdy unit which gives maintenance free performance and exhibits versatility in structure whereby the relay may be readily adapted for use in many types of control systems.

Other objects and characteristic features of the invention will become apparent from the following specification and description of the drawings in which—

Figure 1 is an exploded view in perspective of one embodiment of the novel relay structure, the relay being somewhat enlarged over its true size in these illustrations for the purpose of showing in more details the component parts of the relay;

Figure 2 is a side sectional view of the relay structure shown in Figure 1 illustrating, in more detail, the magnetic circuit of the structure and the break contact arrangement;

Figure 3 is a top plan view of a section of the assembled relay structure;

Figure 4 is an end view of the relay showing the terminal pile-up therefor; and

Figure 5 is a schematic view of one modified embodiment of the relay in which a break-make contact transfer arrangement is provided.

Referring now more particularly to Figures 1 and 2 of the drawings, it will be observed that the reference character 10 refers to a first embodiment of the novel relay structure which incorporates a break contact arrangement. Relay unit 10, as there shown, basically comprises a magnetic housing 11, which forms an integral part of the relay magnetic circuit, an insertable support member 12 and a cap member 13. Housing 11 as shown in the present embodiment comprises a hollow elongated cylinder which mounts a threaded stud member 14 at one end thereof for use in mounting the relay unit with a cooperating tapped receiving member (not shown).

Stud member 14 is centrally drilled to permit the passage of conductors, such as 15 (see Fig. 3), therethrough for internal connection within the relay. Metallic cap member 13 has a shoulder portion 17 which is dimensioned to the inner diameter of the cylindrical housing 12 and is attached thereto by welding or other known methods.

The housing 11 in a commercial embodiment of the invention shown in Figures 1–4, measures 1½" in length (excluding the mounting stud) and .4" in diameter, such dimensions adapting the relay unit for convenient use in equipment having the limited space ordinarily available in aircraft and other free flight equipment.

The operating elements for relay 10 are mounted on the support member 12, which is made of a non-magnetic material such as aluminum which is shaped in the form of a spool 18 having a platform-like extension 19 at the one end thereof for supporting the pile-up assembly 16. In one embodiment the spool member was made of aluminum material. The circular head ends 20 and 21 of the spool portion of mounting member 12 are proportioned for a close tolerance fit with the inner walls of the housing 11 and when the support 12 is inserted and properly positioned within the cylindrical housing 11, holding screws 23 and 24 are inserted through apertures in the housing which are aligned with cooperating tapped apertures in the spool to fixedly mount the spool support member 12 to the housing 11. A third screw 22 and a fourth screw 25 are used to support pole pieces 26a and 26b respectively to the housing 11 independently of the support member 12.

The reduced diameter portion 27 of the spool member 18 which extends between the enlarged heads 20 and 21 serves as a core for the winding 28 of the relay unit 10, such winding in one embodiment comprising 3600 turns of B. S. No. 40 Formex wire. As shown in Figure 1, with the winding 28 mounted on the core, the spool 18 assumes a substantially uniform diameter for its entire length exclusive of the platform portion 19. A wrapper of insulation (not shown) is placed about the core prior to the winding thereof and cellulose acetate washer members such as 30 are disposed between the winding 28 and the spool heads 20 and 21 to insulate the winding therefrom. A final coat of insulation is placed over the mounted winding 28 to insulate same from the housing 11 with the subsequent insertion of the built up support 12 therewithin.

Slot-like passageways 31 and 31a (Fig. 1) located in the spool head 20 provide a protected extension way for the ends of the coil winding 28 to terminals 32 and 33 on pile-up 16 which terminals are portions of conductors 15 which may be connected in a control circuit for the relay 10, the circuit extending the supply of energizing potential to the winding 28. The starting end of the coil is disposed in passageway 31 and is connected over terminal 33 to either polarity of the source and the terminal end of the winding is disposed in passageway 31a and is connected over terminal 32 to the other polarity of the source. With completion of the control circuit to energize the coil winding, polarization and movement of an associated armature 34 is effected in the manner hereafter described.

Spool member 18 is centrally drilled along its longitudinal axis to provide mounting space for the armature member 34 therewithin, the armature 34 being pivotally mounted at the approximate center of its length on a pin 35 the ends of which are supported in apertures (not shown) on opposite sides of the spool interior, whereby pin 35 is disposed on an axis which is perpendicular to the longitudinal axis of the spool.

V-shaped cutaway sections located in the spool heads 20 and 21 receive a pair of V-shaped pole pieces 26a and 26b which are attached to the housing 11 independent of the support 12 when the relay is assembled. The pole pieces 26a and 26b as disposed in the V-shaped sections are located on opposite sides of the plane determined by the pin axis and the center line of the hollow interior of the spool so that with rotation of the armature about the pin 35, the armature ends move toward or away from the pole pieces 26a and 26b.

In the illustrated embodiment, the median lines of the pole pieces 26a and 26b lie in a common vertical plane, the pole piece 26a on the spool head 20 being disposed above the one armature end and the pole piece 26b on spool head 21 being disposed below the other armature end. The cutaway sections of the spool heads both comprise a cut of 45° on either side of the vertical axis for the spool end. The poles 26a and 26b in the final assembly are thus disposed on opposite sides of the pivotally mounted armature member 34, with the narrow end of each of the pole pieces 26a and 26b being disposed directly adjacent an armature end. A small air gap $l$ and $m$ respectively, normally separate the ends of the armature 34 from their associated pole pieces 26a and 26b as shown in Figure 1, a spring member 39 in conjunction with contact member 41 normally maintaining the armature 34 in such position.

Spring member 39 is made of music wire or stainless steel, and has one of its ends attached to an end of the armature 34 and the other of its ends loosely inserted into a hole in insulating member 44 of pile-up assembly 16, the attachment to the armature 34 being effected by inserting the end of the spring into a longitudinally and centrally drilled hole in the ends of the armature and soldering, welding or swedging the spring end therein.

The pile-up assembly 16 also supports a pair of break contact members 40 and 41 in operative relation with the end of armature 34. The ends of the contact members, the armature spring member, and the coil terminal members are electrically spaced from each other by suitable insulating members 42, 43, 44 and 45. A metal clamping plate 46 is mounted on top of the pile-up and two screw members 48 and 49 extend through suitably located apertures in the insulating members and clamping plate to fixedly attach the pile-up to platform 19.

The lower insulating member 42 is located in a rectangular depression 50 which extends rearwardly in the platform from the edge of the spool head to electrically space the lower break spring 40 from the spool head. As more clearly shown in Figure 2, the lower spring member 40 comprises a flat rectangular strip having its one end folded back upon itself for a short distance, the upper side of the overlapped portion having a contact element 51 welded longitudinally of the long direction of the spring.

The second pile-up insulator 43 has an H cross section, the lower recess of which cooperates with a similar recess in the first insulator 42 to position the lower break spring 40 in a given fixed horizontal plane. The upper recess of the second insulator piece 43 cooperates with a similar recess in the third insulator member 44 to position the second contact member 41 in working relation with the first contact member 40. Contact spring 41 comprises a flat rectangular metal strip which is bent convexly to form an arcuate section at its contact making end by the action of spring member 39. A contact element 52 is welded to the contact spring transversely to the springs length and at a location to engage contact member 51. The free end of spring member 41 extends beneath the end of the armature 34. The contact element 52 is mounted at a distance from the support end of the spring 39 which is twice the distance of the point from the armature end of spring 39.

The aperture in the insulator 44 as assembled in the pile-up 16 lies in a horizontal plane which is slightly below that of the armature pivot pin 35 whereby the spring 39 tends to urge the armature 34 slightly beyond the horizontal position, i. e. with the spring end down. The spring contacting end of armature 34 in turn urges the contact on the upper spring member 41 against the contact on the solidly supported lower spring member 40 to provide the described break contact for the relay of the first embodiment. A small piece of insulation 53 is fixed to the upper side of the end of spring 41 to insulate same from the armature 34. It should be understood that space relations are such that spring 41 never is in electrical connection with return spring 39. The mounting of the contact 52 on the movable spring 39 in this physical relation provides a large amount of over travel whereby in the normally closed contact position a substantial movement of the armature 34 is required to effect the opening thereof. Further mounting of spring 41 in the manner of a cantilever; that is with one end supported by the pile-up 16 and the other end arranged to receive the moving forces applied thereto, a minimum value of force is required to effect the desired deflection and a more efficient structure is provided.

The lower spring member 40 and upper spring member 41 project outwardly beyond the pile-up 16 to permit connection thereto of the external lead wires $k$ and $j$ by welding. The extended lead wires pass through the circular aperture of the mounting stud 14.

The fourth insulating member 45 of the pile-up 16 cooperates with two V-shaped slots in the upper side of the third insulator piece 44 to support the terminal members 32 and 33 which are portions of the lead-in wires, the inner ends of which are soldered to the respective ends of the electromagnetic coil and the outward ends of which are passed through the circular aperture of mounting stud 14 to be connected to a source of potential as previously described.

Clamping plate 46 completes the pile-up 16 and suitable screw means 48 and 49 extending through aligned apertures in each of the pile-up members are turned into the tapped holes in the platform to secure the pile-up 16 in fixed relation with the platform 19.

The magnetic flux, generated by the energization of coil 28, flows around the magnetic circuit comprised of armature 34, air gap $l$, pole piece 26a, can 11, pole piece 26b, and air gap $m$. Attractive forces are produced across the air gaps $l$ and $m$ which tend to rotate armature 34 in a counterclockwise direction about pivotal axis 35. Relay operation occurs when these forces in conjunction with the counterclockwise force exerted by contact spring 41 are of sufficient magnitude to overcome the clockwise force exerted by spring 39. The counterclockwise force of contact spring 41, which previous to relay operation was overcome by the clockwise force of spring 39 and effected closing of contacts 51 and 52, is thereby permitted to act to separate contacts 51 and 52.

Assuming the forces which tend to produce rotation clockwise to be of a negative characteristic and counterclockwise to be a positive characteristic; and assuming the length of the air gaps varies from some positive value in the open position to zero in the closed position, the operating values necessary to effect the desired operation may be defined as follows:

$fs$—force of biasing return spring 39;
$fc$—force of contact spring 41; and
$fi$—force exerted on the armature by the energized electromagnetic coil 28.

Considering the absolute value, it can be seen that in the non-energized condition, the force of the biasing return spring 39 must equal the force of the contact spring 41 ($|fs|$ equals $|fc|$). Also for operation of the armature 34, the tractive force upon armature 34 due to current flowing in the coil 28 plus the force of the contact spring 41 must be greater than the force of biasing spring 39; that is $|fi|+|fc|>|fs|$. Finally, the algebraic sum of the forces as the air gap distance decreases must be continuously positive in order to bring the contacts to the required open position. Therefore, $fi$ must be continually $>|fc|+|fs|$. If these relative conditions are maintained a successful operating unit will be provided.

It is apparent that with the armature pivotally supported in the center and the flux concentrated in air gaps at both ends of the armature, a strong operating torque is applied to the armature. The provision of a solidly positioned break contact member 40 in association with a flexibly mounted upper contact member 41 having spring follow minimizes possible openings of the contact as a result of applied vibration and acceleration forces.

With the relay mounted so acceleration of the associated equipment is applied to the relay in a direction parallel to the armature mounting pin 35, the effective force thereon has no tendency to rotate the armature from its contact closing position. A similar force reaction is experienced in the case of acceleration applied in the long direction of the relay structure. There is a tendency for armature rotation in the event of the application of forces in a direction perpendicular to both pivot pin 35 and the armature 34 due to the unbalance created by return spring 39 and contact spring 41. This unbalance was not found to be bothersome in the first embodiment, but if it should become so compensation can be made by means of counter-balancing.

In a commercial embodiment having the dimensions and values set forth hereinbefore, the application of 50 milliamperes of current to the winding of 290 ohms resistance provided successful operation in equipment in which applications in excess of 1,000 gravities were made along the long direction of the relay and in excess of 100 gravities were applied in the other two coordinate directions; successful operation by definition including constant contact closure at all times during the force applications when the coil was not energized and proper contact opening when the coil was energized.

In such embodiment a spring tension of about 25 grams existed at the spring end of the armature and about 35 grams between the contacts, the amount of travel of the armature being approximately .010″. The power source was in the order of 725 milliwatts and the contact members were rated at approximately one-half ampere.

The pole piece members 26a and 26b comprise a 90° segment cut from a circle member having a radius of .175″, the lower portion of which is cut off by a chord of the circle so that the distance from the chord to the circumference is .14″ to provide for air gaps $l$ and $m$ as shown in Figure 1.

The lower break spring 40 was made of a nickel silver blank .7635″ long, which is overlapped upon itself .1115″ to provide a total length of approximately one-half inch. The thickness of the overlapped portion is .032″. The lever spring contact is made from a phosphor bronze blank which is approximately one-half inch in length and .004″ thick. Armature spring 39 is .014″ in diameter and .475″ long.

Armature member 34 is approximately 1″ in length and is tapered with the ends being .100″ in width and the center portion .1465″ in width, being .050 in thickness. Support pin 35 for the armature is made of stainless steel and is .198″ long, air gaps $l$ and $m$ are in the approximate order of .01″ when the armature is in its normal position.

One of the preferred methods of assembly of the unit is accomplished in the following manner:

a. The inner pole piece 26a is placed in the cooperating segment of the spool head 20;

b. The coil engaging wires and the control conductors 15 are threaded through the circular aperture in stud 14;

c. The spool assembly is pushed into the can until the inner pole piece 26a is in position for securement by means of the cooperating screw 22;

d. The two spool securing screws 23 and 24 are turned into the spool platform 19;

e. The end pole piece 26b is inserted and secured by cooperating screw 25;

f. The end cap 13 is soldered to the housing 11.

The spaced relationship between the armature 34 and the other moving parts of the structure is not dependent upon the spaced relation between support 12 and the housing 11, but are fixedly determined by the spool assembly only. After assembly the lever spring is adjusted to make the travel distance between the end of the armature 34 and the pole piece 26a approximately .010″. One-half of this travel distance should be affected with the contacts on springs 40 and 41 closed and the other half with the contacts open. Furthermore with a coil 28 of a value set forth the relay should close the air gap to zero with the application of between 30 and 40 milliamperes when relay is static.

Adjustment can be made by bending the return spring 39 and contact spring 41 to give the desired "half-half" travel. If further adjustment is necessary, bending of lever spring 39 is done to meet the 30–40 milliampere operating figures.

In a second embodiment of the invention the relay structure, schematically shown in Figure 5, includes a transfer pile-up 16a similar to break pile-up 16 of Figure 1 as modified to provide a make and break set of contacts. The armature 34a in such arrangement is biased into a given normal position by either or both of a pair of spring members 60 and 61 having arcuate ends, the springs being mounted within the spool hollow on either side of the armature relative to its calculated path of movement.

With the energization of the coil and the consequent polarization of the armature, the restraining force of the spring members 60 and 61 is overcome and the armature which is attached to contact member 64 is moved counter-clockwise openings contacts 63 and 65 and closing contacts 66 and 68.

The pile-up arrangement in this embodiment comprises a fixed contact bearing member 62 having contact 63 attached thereto, a transfer spring 64 having contacts 65 and 66 respectively attached to the upper and lower faces thereof, and an upper fixed contact bearing member 67 having contact 68 attached on the lower face thereof. A series of insulating members 42a, 43a, 44a and 45a are arranged in the manner of the previous disclosure to support the lever spring and contact support member in electrically spaced relation in the pile-up. An insulating plug 70 is inserted in the drilled end of the armature in place of the armature spring 39 which was used in the first embodiment, and is secured thereto by friction or swedging. An extension on the plug locates in a close fitting manner in an aperture in the inward end of the transfer spring 64. With movement of the armature between its normal and energized positions the contact bearing transfer spring 64 is moved by the armature plug 70 to alternatively close and open the contacts 66, 68 and 63, 65. Operation of the relay responsive to energization of coil 28 is similar to that set forth relative to the first embodiment.

*Conclusion*

The novel structural arrangement of the relay unit set forth herein before provides a control member capable of successful operation with equipment which is subjected to the most severe of acceleration and shock forces. High sensitivity, stability and excessive holding force with the application of a minimum amount of power are features which are inherent in the disclosed structure.

The provision of a housing member which forms a part of a magnetic circuit effects a substantial reduction in the reluctance of the circuit and a stronger operatnig force is thus obtained for a given power application. The central pivotal mounting of the armature within the relay winding permits the application of this stronger operating force to both ends of the armature over a relatively short flux path, and these forces are further amplified in accordance with the lever arm principle. A relay of more positive acting characteristics, greater stability and greater sensitivity is thus provided.

Additionally the novel arrangement of the disclosure is extremely compact in nature and uses a minimum number of parts which lend themselves to convenient adjustment during assembly. The structure also adapts itself for convenient hermetic sealing where necessary.

The operating structure above described is rendered further effective by the provision of a novel contact set arrangement in which either a break set or a make-break set may be used with success. The use of a pair of contact bearing spring members, one of which is fixedly positioned and the other of which is mounted for over-travel operation with regard to the contacts insures the provision of a contact arrangement which will successfully withstand the application of the most severe acceleration and shock forces. Further the mounting of the movable spring of the pair in a cantilever fashion provides an arrangement in which the ratio of applied force to deflection is small, whereby less demand is made upon the operating members of the relay in the operation of the contact elements. The novel spring tension means set forth further insures the provision of a contact set which maintains its given position under the most severe conditions.

The combination of these individually novel and effective structural arrangements results in a relay unit which is especially adapted for use in those fields using equipment which have to withstand the application of shock and acceleration forces and materially advances the control system for such equipment. Various other features of the invention which are believed to be new are set forth in the accompanying claims.

What is claimed is:

1. A relay structure for use in equipment subjected to excessive acceleration forces along its various axes comprising in combination, a magnetic housing member for enclosing the relay operating structure, a hollow core support member for supporting the elements of the relay which is adapted to be inserted within said housing, an armature member extending axially of said core and mounted within said hollow core for pivotal movement about an axis lateral to said armature, an operating coil wound about said support member, a pair of spaced pole pieces attached to said magnetic housing in given spaced relation at the opposite ends of and on opposite sides of said armature, whereby an efficient flux path including said pole pieces, said spaced air gaps, said armature and said housing is provided for said structure with each energization of said coil, and contact members positioned for operation by said armature with each movement thereof.

2. A relay structure comprising a housing member of a magnetic material for enclosing the relay operating structure, a hollow core support member for supporting the elements of the relay which is adapted to be inserted within said housing, a balanced armature member extending axially of said core and mounted within said core about a lateral axis of the armature for arcuate rotation about its central axis and between at least two given positions, a pair of spaced pole pieces attached to said magnetic housing in spaced relation with and at the opposite ends and on opposite sides of said armature, tension means for positively biasing said armature to a first of said positions, an operating coil wound about said support member for effecting movement of said armature to the second of said positions with energization thereof, and contact members positioned for operation with each movement of said armature between said positions.

3. A relay structure comprising a housing member of magnetic material for enclosing the relay operating structure, a hollow core support member for supporting the elements of the relay which is adapted to be inserted within said housing, a balanced armature member extending axially of the core and pivotally mounted within said hollow core about an axis lateral to the armature, a pair of spaced pole pieces on said housing disposed in given spaced relation at the opposite ends of and on opposite sides of said armature, tension spring means for normally biasing said armature to one of said two positions, an operating coil wound about said support member for operating said armature to the other of said positions with the energization thereof, a contact set comprising a first contact bearing spring positioned in parallel relation to the major axis of said housing, and a second contact bearing spring mounted as a cantilever with its free end disposed adjacent an end of said armature for operation thereby into and out of contact making relation with said first contact bearing spring member responsive to each operation of said armature.

4. A relay structure as set forth in claim 3 in which said contact on said second spring member is mounted at a point which is twice the distance from the stationary end as from the free end of the spring member, and said contact on said first spring member is mounted relative thereto for engagement by said second spring member.

5. A relay structure comprising a magnetic housing member for enclosing the relay operating structure, a hollow core support member for supporting the elements of the relay which is adapted to be inserted within said housing, an armature member extending axially of the core and pivotally mounted on a lateral axis of the armature therewithin for operation between at least two given positions, a pair of spaced pole pieces mounted in magnetic circuit completing relation with said housing and disposed in given spaced relation at the opposite ends of and on opposite sides of said armature, tension spring means for normally biasing said armature to one of said given positions, an operating coil wound about said support member for operating said armature to the other of said positions with the energization thereof, a contact set comprising a first fixedly positioned contact bearing spring, and a second contact bearing spring which is substantially longer than said first contact bearing spring member and which is mounted in cantilever fashion with the excess length extending beyond the length of said first member for engagement with and operation by the one end of said armature, said one position of said armature being located so as to bring said contacts on said cantilever member into firm contact with the contacts on said stationary member and travel past said contact making point to effect flexing of the free end of said second spring member, whereby firm shock and acceleration resistant contact between the members is provided.

6. A relay structure comprising in combination, a magnetic housing member for enclosing the relay operating structure, a hollow core spool member having a platform extension at one end thereof for supporting certain of the elements of the relay, said spool member being adapted for insertion within said housing, an armature member extending axially of and pivotally mounted within said core about an axis extending lateral to said armature, an operating coil wound about said support member, a pair of spaced pole pieces attached to said magnetic housing in spaced relation at the opposite ends of and on opposite sides of said armature, a contact set comprising at least a first and a second contact bearing spring, positioning means on said platform for supporting said first spring in a given fixed position and for supporting said second spring in a cantilever fashion with the free end of said second spring being disposed adjacent one end of said armature for operation into and out of contact with said fixed spring member by said armature in its movement.

7. A relay structure comprising in combination, a magnetic housing member for enclosing the relay operating structure, a hollow core spool member for supporting the elements of the relay which is adapted for insertion within said magnetic housing, an armature member extending axially of the core and being pivotally mounted within said core about an axis extending laterally of the armature for operation between at least two positions, a pair of spaced pole pieces attached to said magnetic housing in given spaced relation at the opposite ends of and on opposite sides of said armature, tension means comprising a stiff wire spring member for normally biasing said armature to a first one of said positions, positioning means on said platform for fixedly supporting one end of said spring in biasing relation for said armature, an operating coil wound about said support member for effecting movement of said armature to the second of said positions with energization thereof, and a contact set supported by said positioning means for operation by said armature in its movements between said positions.

8. A relay structure as set forth in claim 7 in which said contact set comprises a first contact bearing spring supported in a given stationary position, and a second contact bearing spring supported in cantilever fashion by said positioning means with the free end of said second contact bearing spring disposed adjacent one end of said armature for operation thereby into and out of contact with said first contact bearing spring member.

9. A relay structure as set forth in claim 8 in which said second contact bearing spring is substantially longer than said first contact spring and said second spring is positioned with said greater length extending into operating contact with said one armature end, said one armature position being located in an overtravel relation to said contacts, whereby said free end of said second spring member is flexed to absorb the additional movement of said armature which is effected after said members are brought into contact.

10. A relay structure for use in equipment which is subjected to excessive acceleration forces along its various axes comprising in combination a magnetic housing member in the order of 1.5" in length and .4" in diameter for enclosing the operating members of the relay unit, a hollow core spool member for supporting the elements of the relay which is adapted to be inserted within said housing, an armature member extending axially of the core and being pivotally mounted within said core on an axis extending laterally of the armature for operation between two given positions, an operating coil wound about said support member, a pair of spaced pole pieces attached to said magnetic housing in given spaced relation at the opposite ends of and on opposite sides of said armature, and contact members including a first contact bearing spring supported in a given stationary position, and a second contact bearing spring supported in cantilever fashion with the free end of said second member disposed adjacent one end of said armature for movement thereby into and out of engagement with said first spring, and biasing means for imposing a spring tension of approximately 25 grams at said armature end to normally bias said contacts into circuit closing position, whereby the contacts will withstand the force of 1,000 gravities acceleration as applied to the long dimension of said relay and 100 gravities acceleration force as applied to the structure in the other two coordinate directions.

11. A relay structure as set forth in claim 10 in which the winding on said support member has a maximum resistance of 300 ohms to provide a magnetic field for operating said armature to open said contacts responsive to the application of 50 milliamperes current to said winding in a maximum operating time of 25 milliseconds.

12. A relay structure comprising a magnetic housing member for enclosing the relay operating structure, a hollow core support member for supporting the elements of the relay which is adapted to be inserted within said housing, an armature member extending axially of the core and being pivotally mounted within said core on an axis extending lateral of said armature for operation between at least two given positions, a pair of spaced pole pieces disposed in magnetic circuit completing relation with said housing and at the opposite ends and on opposite sides of said armature, tension means for positively biasing said armature to a first of said positions, an operating coil wound about said support member for effecting movement of said armature to the second of said positions with energization thereof, said contact set comprising a transfer pile-up including a pair of make and break contacts which are operated with each movement of said armature between said two positions.

13. A relay structure as set forth in claim 12 in which said contact set includes a first and a second fixedly positioned contact bearing spring, and a contact bearing transfer member connected to one end of said armature for movement thereby between said two fixedly positioned spring members.

14. A relay structure as set forth in claim 13 in which said tension means for said armature comprise one or a pair of preformed springs located either one on either side of said armature or one on both sides of said armature within said hollow spool portion.

(References on following page)

References Cited in the file of this patent

UNITED STATES PATENTS

| | | |
|---|---|---|
| 1,863,436 | Paniagua | June 14, 1932 |
| 2,043,746 | Garstang | June 9, 1936 |
| 2,131,789 | Sullivan et al. | Oct. 4, 1936 |
| 2,193,516 | Laing | Mar. 12, 1940 |
| 2,310,138 | Whittaker | Feb. 2, 1943 |
| 2,364,656 | Price | Dec. 12, 1944 |
| 2,455,049 | Edwards et al. | Nov. 30, 1948 |
| 2,499,394 | Kesselring | Mar. 7, 1950 |
| 2,545,587 | Prouty | Mar. 20, 1951 |
| 2,606,981 | Kesselring et al. | Aug. 12, 1952 |

FOREIGN PATENTS

| | | |
|---|---|---|
| 118,575 | Australia | May 31, 1944 |
| 215,679 | Great Britain | May 15, 1924 |
| 572,686 | Great Britain | Oct. 18, 1945 |
| 632,794 | Great Britain | Dec. 5, 1949 |